United States Patent
Kalinin et al.

(10) Patent No.: US 10,878,105 B2
(45) Date of Patent: Dec. 29, 2020

(54) SYSTEM AND METHOD FOR IDENTIFYING VULNERABILITIES OF APPLICATIONS BY INTERCEPTING FUNCTION CALLS

(71) Applicant: AO Kaspersky Lab, Moscow (RU)

(72) Inventors: Alexander V. Kalinin, Moscow (RU); Sergey A. Rumyantsev, Moscow (RU); Igor Y. Kumagin, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 236 days.

(21) Appl. No.: 16/122,963

(22) Filed: Sep. 6, 2018

(65) Prior Publication Data

US 2019/0325143 A1    Oct. 24, 2019

(30) Foreign Application Priority Data

Apr. 19, 2018  (RU) ................ 2018114429

(51) Int. Cl.
*G06F 21/57*   (2013.01)
*G06F 21/55*   (2013.01)
(Continued)

(52) U.S. Cl.
CPC ........ *G06F 21/577* (2013.01); *G06F 11/0772* (2013.01); *G06F 11/3672* (2013.01);
(Continued)

(58) Field of Classification Search
USPC .......................................... 726/25
See application file for complete search history.

(56) References Cited

U.S. PATENT DOCUMENTS

| 5,485,409 | A  | * | 1/1996 | Gupta | ............... G06F 21/577 |
|           |    |   |        |       | 713/164 |
| 7,752,609 | B2 | * | 7/2010 | Rioux | ............... G06F 8/427 |
|           |    |   |        |       | 717/141 |

(Continued)

OTHER PUBLICATIONS

Carmel-Veilleux et al., "A Novel Low-Overhead Flexible Instrumentation Framework for Virtual Platforms", 2010 IEEE, pp. 92-98 (Year: 2011).*

(Continued)

*Primary Examiner* — Khalil Naghdali
(74) *Attorney, Agent, or Firm* — Arent Fox LLP; Michael Fainberg

(57) ABSTRACT

Disclosed herein are methods and systems of identifying vulnerabilities of an application. An exemplary method comprises identifying at least one function in executable code of the application according to at least one rule for modification of functions, adding an interception code to the executable code of the application upon launching of the application, executing the application with the added interception code, collecting, by the interception code, data relating to function calls performed by the application during execution, analyzing the collected data based on criteria for safe execution of applications, wherein the criteria comprises a range of permissible values of arguments of intercepted function calls and identifying inconsistencies between the analyzed data and the criteria for safe execution of applications, wherein the inconsistencies indicate vulnerabilities in the application.

20 Claims, 3 Drawing Sheets

(51) Int. Cl.
*G06F 21/54* (2013.01)
*G06F 11/07* (2006.01)
*G06F 21/51* (2013.01)
*G06F 11/36* (2006.01)

(52) U.S. Cl.
CPC .............. *G06F 21/51* (2013.01); *G06F 21/54* (2013.01); *G06F 21/552* (2013.01); *G06F 2201/81* (2013.01); *G06F 2221/033* (2013.01)

(56) References Cited

U.S. PATENT DOCUMENTS

| | | | |
|---|---|---|---|
| 7,945,953 | B1 | 5/2011 | Salinas et al. |
| 9,047,396 | B2* | 6/2015 | Chen ................... G06F 11/0757 |
| 9,390,261 | B2 | 7/2016 | Costa et al. |
| 2007/0074188 | A1 | 3/2007 | Huang et al. |
| 2009/0126017 | A1 | 5/2009 | Chahal |
| 2012/0240236 | A1* | 9/2012 | Wyatt ..................... G06F 21/10 |
| | | | 726/25 |
| 2014/0165204 | A1 | 6/2014 | Williams et al. |
| 2016/0099963 | A1* | 4/2016 | Mahaffey ............ H04L 63/0227 |
| | | | 726/25 |
| 2017/0083701 | A1* | 3/2017 | Tajalli ..................... G06F 21/53 |
| 2019/0180035 | A1* | 6/2019 | Esperer ................. G06F 21/577 |
| 2019/0286817 | A1* | 9/2019 | Butler ................. G06F 13/4282 |

OTHER PUBLICATIONS

Skaletsky et al., "Dynamic Program Analysis of Microsoft Windows Applications", 2011 IEEE, pp. 2-12 (Year: 2010).*

\* cited by examiner

SYSTEM AND METHOD FOR IDENTIFYING VULNERABILITIES OF APPLICATIONS BY INTERCEPTING FUNCTION CALLS

CROSS REFERENCE TO RELATED APPLICATIONS

This application claims benefit of priority under 35 U.S.C. 119(a)-(d) to a Russian Application No. 2018114429, filed Apr. 19, 2018, the entire contents of each of which are incorporated herein by reference.

FIELD OF TECHNOLOGY

The disclosure generally relates to solutions for the testing for vulnerabilities of applications, and more specifically to systems and methods of identifying vulnerabilities of applications by intercepting function calls.

BACKGROUND

At present, the number of applications being implemented on computers and mobile devices is steadily rising. There are many applications which are regularly updated, the development of which drags on for years, starting under one operating system and continuing onwards based on the development of the IT industry (continuing under a different version of the operating system or under an entirely different operating system). Other applications are developed "from scratch", yet oftentimes at an accelerated pace, so as not to fall behind the competition.

As a result of the lengthy, rapid, and also customary development process, vulnerabilities arise in these applications. By utilizing vulnerabilities in applications (such as exploits), criminals may cause incorrect working of an application, as a result of which they may gain unlawful access to the user's data and thereby inflict harm or material loss on him.

Different types of vulnerabilities are known, such as buffer overflow—a vulnerability arising when an application writes data outside the bounds of the buffer allocated in memory, which oftentimes leads to the executing of malicious code. Likewise, a substantial number of vulnerabilities are introduced into applications by incorrect use of the application programming interface (API) of the operating system. Furthermore, it is difficult to check for the presence of these vulnerabilities in the modules of applications without having access to the source code of these application modules.

The problems of applications with vulnerabilities cannot be solved on the level of the operating system, since operating systems provide abundant possibilities of ensuring backward compatibility (applications created several years ago and using API functions of the operating system prior to an update can be launched on the operating system after the update), and the constantly repeated demands for security remain at the level of recommendations. In other words, recommendations exist describing how to properly call the functions of the operating system and in what sequence, in order to ensure the safe execution of an application, and how to create a safe application under a particular operating system, but these recommendations are not obligatory when creating an application.

Vulnerabilities arise not only due to mistakes in the code, but also in cases of incorrect use of API functions. The proposed system for identifying vulnerabilities makes it possible to identify an incorrect use of API functions by an application after the launching of the application with the use of an intercepting of the API function calls and an analysis of the data obtained in the intercept.

SUMMARY

Disclosed are system and methods for identifying vulnerabilities in applications by intercepting of function calls. In one exemplary aspect, a method of identifying vulnerabilities of an application by intercepting function calls is provided.

The method may comprise identifying, by a hardware processor, at least one function in executable code of the application according to at least one rule for modification of functions, the at least one rule containing at least a prototype of the function and a calling convention for the function, adding an interception code to the executable code of the application upon launching of the application, wherein the interception code is configured to intercept calls to functions made by the application, executing, by the hardware processor, the application with the added interception code, collecting, by the interception code, data relating to function calls performed by the application during execution, analyzing the collected data based on criteria for safe execution of applications, wherein the criteria comprises a range of permissible values of arguments of intercepted function calls and identifying inconsistencies between the analyzed data and the criteria for safe execution of applications, wherein the inconsistencies indicate vulnerabilities in the application.

In another aspect, the intercepted functions comprise at least one of a function of the operating system or a function of standard libraries of programming languages.

In another aspect, the interception code modifies functionality of the application by calling a function in the interception code with an Application Binary Interface (ABI) that matches an intercepted function, and wherein the interception code establishes control over a process associated with the application.

In another aspect, the rules of modification specify a set of actions that the interception code performs during execution.

In another aspect, the actions comprise one or more of saving arguments of the function in a log file, generating a system event, not executing an intercepted function, and changing a value of an argument.

In another aspect, the rules of modification further specify conditions for validity of changing a value of an argument of an intercepted function.

In another aspect, the method further comprises executing the application using automatic tests.

In another aspect, the data comprises values of arguments of the intercepted functions.

In another aspect, the method further comprises identifying a degree of criticality contained in the criterion and interrupting execution of the application when the degree of criticality exceeds a predetermined threshold value.

In another aspect, the method further comprises identifying a degree of criticality contained in the criterion and creating a log entry regarding the at least one vulnerability when the degree of criticality exceeds a predetermined threshold value.

An exemplary system according to the present disclosure may comprise a hardware processor configured to identify at least one function in executable code of the application according to at least one rule for modification of functions, the at least one rule containing at least a prototype of the function and a calling convention for the function, add an interception code to the executable code of the application upon launching of the application, wherein the interception code is configured to intercept calls to functions made by the application, execute the application with the added interception code, collecting, by the interception code, data relating to function calls performed by the application during execution, analyze the collected data based on criteria for safe execution of applications, wherein the criteria comprises a range of permissible values of arguments of intercepted function calls and identify inconsistencies between the analyzed data and the criteria for safe execution of applications, wherein the inconsistencies indicate vulnerabilities in the application.

An exemplary non-transitory computer-readable medium stores instructions thereon, the instructions comprising identifying at least one function in executable code of the application according to at least one rule for modification of functions, the at least one rule containing at least a prototype of the function and a calling convention for the function, adding an interception code to the executable code of the application upon launching of the application, wherein the interception code is configured to intercept calls to functions made by the application, executing the application with the added interception code, collecting, by the interception code, data relating to function calls performed by the application during execution, analyzing the collected data based on criteria for safe execution of applications, wherein the criteria comprises a range of permissible values of arguments of intercepted function calls and identifying inconsistencies between the analyzed data and the criteria for safe execution of applications, wherein the inconsistencies indicate vulnerabilities in the application.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE FIGURES

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for identifying vulnerabilities of applications by intercepting function calls. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In the present disclosure, components of the system refer to actual devices, systems, elements, or a group of elements realized with the use of hardware, such as integrated microcircuits (application-specific integrated circuit, ASIC) or field-programmable gate arrays (FPGA) or, for example, in the form of a combination of software and hardware, such as a microprocessor system and a set of program instructions, as well as neuromorphic (neurosynaptic) chips. The functionality of said means of the system may be realized exclusively by hardware, as well as in the form of a combination where some of the functionality of the means of the system is realized by software and some by hardware. In one exemplary aspects, some of the means or all of the means may be implemented on the processor of a general-purpose computer (such as the one shown in FIG. 3). The components (each of the means) of the system may either be realized within a single computing device or spread out among several interconnected computing devices.

Figure 1:
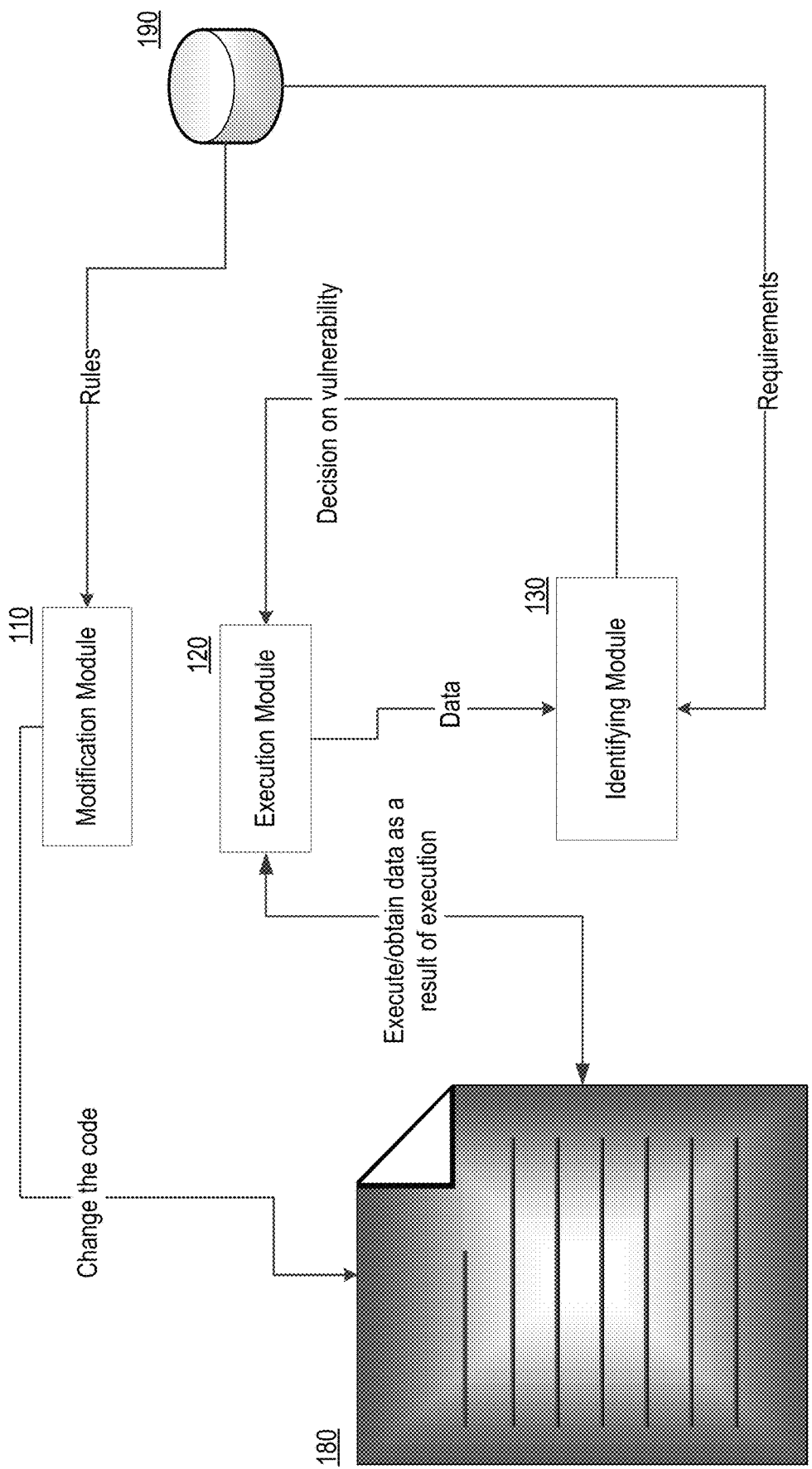
FIG. 1 shows an exemplary system for identifying vulnerabilities of applications by intercepting function calls.

FIG. 1 illustrates a block diagram of an exemplary system 100 for identifying vulnerabilities of applications by intercepting function calls. The system 100 consists of a modification module 110, an execution module 120 and a vulnerabilities identification module 130. In the general case, the system 100 may be executed on a server or in a cloud service by the manufacturer of the applications (for example, security applications or antivirus applications). In a particular instance, the system may be executed on the user's computing device, being part of a security application or antivirus application.

In the general case, upon launching of the application being analyzed for the purpose of identifying vulnerabilities, the modification module 110 modifies (changes and/or adds to) the executable code of the application being analyzed 180 in accordance with rules of modification. In some aspects, vulnerabilities include weaknesses of software or information system that can be used to implement threats to information security. See paragraph [0005] above for examples of vulnerabilities. The executable code is modified such that, instead of calling verifiable functions in the process of execution of the executable code, analogous functions will be called with a matching Application Binary Interface (ABI). For example, only those functions that are verifiable (e.g., checked or particularly interesting functions) can be added to intercepting code in the execution process. In the present disclosure, verifiable functions refer to the functions of the operating system (OS), as well as the functions of standard libraries of programming languages (such as the function "print( )"). Thus, the modified code is executed in the context of the application being analyzed 180.

In the general case, the rules for modification of the functions are stored in a database 190. The database 190 stores at least the prototype of the function (containing the name of the function, the arity, the types of arguments and the returnable data type) and the calling convention for that function. In one exemplary aspect, the database for non-exportables (such as functions of standard libraries of programming languages) contains signatures which uniquely allow identification of the non-exportable function in the code of the application being analyzed 180. In this aspect, a non-exportable function refers to a function that can be modified by the compiler during the build process, taking into account known optimizations. Calls of such functions can be detected using signatures (byte sequences), for example. Subsequent to the detection, code can be added to intercept these non-exportable functions.

Furthermore, in one exemplary aspect, the rule for modification may contain a code which needs to be added upon modification of the application being analyzed 180. In another exemplary aspect, the rule for modification contains a set of actions which need to be performed as a result of the modification of the code of the application being analyzed 180 during its execution. Such actions are (but not limited to):

saving the argument of the function in a log;
generating a system event;
not executing the original function whose call was intercepted by the code modification;
changing the value of an argument.

In yet another exemplary aspect, the rule for modification contains conditions for changing the arguments of the functions. For example, if the argument is greater than a particular numerical value, change the value to be equal to a threshold value; if the argument is an empty string, change the argument to a non-empty string, and so forth.

According to one aspect, modification of the executable code of the application being analyzed 180 by the modification module 110 may comprise the identification of functions in accordance with the rules for modification of the functions in the code of the application being analyzed 180. Modification of the executable code may additionally comprise adding of a "hook" function to the application being analyzed 180. In some aspects, a hook function is code which performs the intercepting of (or which intercepts) the call to a particular function and establishes control instead of the called function. Thus, as a result, instead of calling the original function, the hook function is called, precisely matching the application binary interface of the original function. After completing execution of the hook function, control is returned to the originally called function.

Examples of adding hook functions are presented below.

At the assembler level, the code of a function looks like this:

| | |
|---|---|
| 00200000 | mov eax, 0 |
| 00200004 | mov ebx, 10 |
| 00200008 | add eax, ebx |
| 0020000d | call 0x8000f0cd |
| 00200010 | cmp eax, 0x12 |
| ... | |
| 00016d8 | retn |
| The function is called like this: | |
| 75212412 | call my_func |
| which is equivalent to: | |
| 75212412 | call 00200000 |

Control is transferred to the address 00200000, and upon calling "retn" it is returned to the address 75212412+4 (since the "call" command occupies 4 bytes).

On the basis of data about the prototype in the function and the calling convention for that function, the executable code is changed as follows:

| | |
|---|---|
| 00200000 | call hook |
| 00200004 | mov ebx, 10 |
| 00200008 | add eax, ebx |
| 0020000d | call 0x8000f0cd |
| 00200010 | cmp eax, 0x12 |
| 00016d8 | retn |

Namely, a hook function has been added to the code in the form of a call for the "hook" function.

After modification, according to one aspect the execution module 120 executes the application being analyzed 180. In one aspect, the execution module 120 may gather data obtained by the hook functions and perform the above-described actions by the code modification executed by the modification module 110. According to one example, the execution module 120 gathers data on the values of the arguments of the function and saves this data in a log. For example, in high and medium level languages, function prototypes indicate the number and type of arguments accepted (e,g., in C, a function may be: "int function1(int a, double b, char *c)). When a function is called, variables or parameters that are initialized with some values are generally used. For example, function1 (aa, bb, cc): when intercepting, the mentioned values are available. Depending on the type of arguments aa, bb and cc, the value with which these arguments are initialized will be available. In this aspect, the type of the arguments and the values are stored in the log.

In one exemplary aspect, the gathered data is transmitted by the execution module 120 to the vulnerabilities identification module 130. In one exemplary aspect, the vulnerabilities identification module 130 may be part of the execution module 120 and may analyze the data obtained from the execution module 120 to pronounce a decision as to the presence of vulnerabilities in the executable application being analyzed 180.

The vulnerabilities identification module 130 analyzes the data obtained from the execution module 120, provided by the hook functions during the calls of the functions of the operating system, as well as the functions of standard libraries of programming languages. According to one aspect, the analysis is performed with the aid of criteria (alternatively referred to as requirements in portions of the disclosure) for safe execution (hereafter in the text, criteria). In one exemplary aspect, the criteria are stored in the database 190. The criteria contains at least the range of permissible values of the arguments for a called functions being intercepted by modifications performed by the modification module 110. The criteria in the general case may be changed and supplemented in the process of the working of the system on the basis of so-called "best practices", information about obsolete functions and functions placed by the software manufacturers (such as Microsoft) on a list of functions recognized as being unsafe (such as "strcpy( )"). In one exemplary aspect, the criteria contain recommendations in the context of safe programming (for example, in Windows there are safe and unsafe functions for creating files). In one exemplary aspect, the degree of criticality may be specified for at least one criterion. The degree of criticality is a numerical value which is higher as the application being analyzed 180 is more vulnerable. In one aspect, if the data obtained from the execution module 120 is inconsistent with the range of permissible values of the arguments contained in the criteria, the vulnerabilities identification module 130 identifies a vulnerability in the application being analyzed 180.

In one exemplary aspect, if the vulnerabilities identification module 130 has identified a vulnerability, and the criterion used to identify the vulnerability contains a degree of criticality, then the vulnerabilities identification module 130 will send that degree of criticality of the vulnerability to the execution module 120, together with the decision about the vulnerability.

In one exemplary aspect, the execution module 120 works in a synchronous manner with the vulnerabilities identification module 130, that is, it waits for a decision from the vulnerabilities identification module 130 as to the presence of vulnerabilities in the executable application being analyzed 180. In another exemplary aspect, the execution module 120 works asynchronously with the vulnerabilities identification module 130, that is, it continues working, not waiting for a decision from the vulnerabilities identification module 130.

In one exemplary aspect, in the event that a vulnerability is identified, the execution module 120 interrupts (in one aspect, halting) the execution of the application being analyzed 180 if the degree of criticality exceeds a predetermined threshold. In yet another exemplary aspect, the execution module 120, upon identifying a vulnerability, creates a log entry as to the identified vulnerability. In still another exemplary aspect, the degree of criticality of the vulnerability is considered: if criticality is above a threshold value, the execution of the application being analyzed 180 is interrupted. In another exemplary aspect, the execution of the application being analyzed 180 is continued by the execution module 120.

Some working examples of the present system are described below.

In the example of an application executing on Windows OS, the criteria can include a rule that indicates the use of the OS API function "LoadLibrary(path)". In other words, the criteria specifies that the path to the library being loaded should be in Fully-Qualified Path format (for example, "C:\fully\qualified\path\to\module.dll"). This criteria was developed in order to specify which dynamic library needs to be loaded for the application, since if a short path is transmitted (such as "module.dll") the OS will not know exactly where the module should be loaded from, and will try to load it from different locations. Execution of a library from an unspecified location may result in the loading of an incorrect instance of the module that may execute foreign code, which is a vulnerability. Thus, the hook function added by the modification module 110 and called in place of the original API function "LoadLibrary( )" considers the path to the module from the argument. This path may be saved by the execution module 120, and the vulnerabilities identification module 130 may check the path for consistency with the criteria, namely, whether it is indicated in the Fully-Qualified Path format, if the path is not in fully qualified path format, then the vulnerabilities identification module 130 pronounces a decision that the application 180 has a vulnerability.

In one aspect, for applications executing in the Linux OS one criterion specifies that allocation of memory pages with attributes for writing and execution at the same time is forbidden. "mmap( )" is a function In Linux for allocating of memory pages, which takes an argument responsible for allocating the access handle on the memory page. The hook function is called in place of the original function "mmap( )" and will read the argument responsible for the access handle. The vulnerabilities identification module 130 will compare this to the value which is equivalent to the write and execute rights, and if those bits for access to the memory are present in this argument, the vulnerabilities identification module 130 will pronounce a decision as to a vulnerability.

Figure 2:
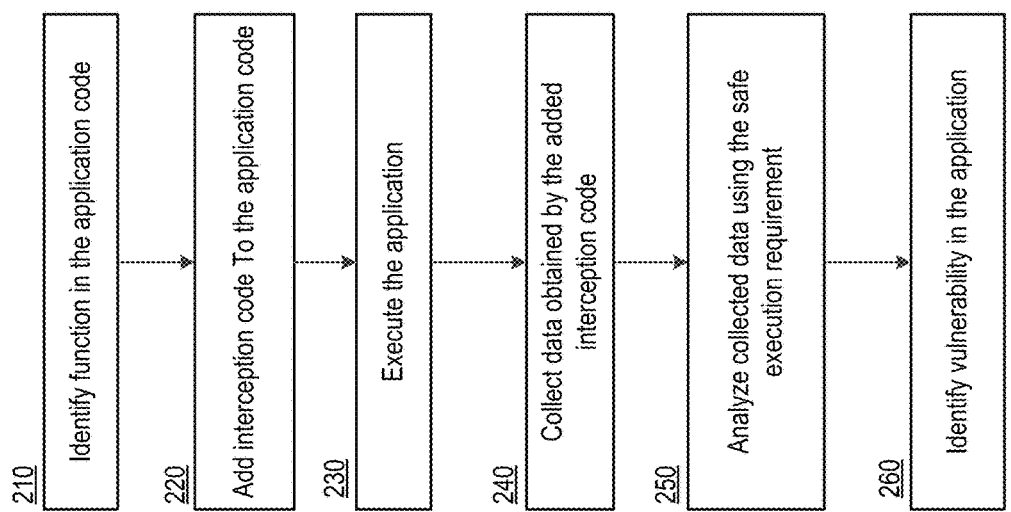
FIG. 2 shows an exemplary method of identifying vulnerabilities of applications by intercepting function calls.

FIG. 2 is a flow diagram for an exemplary method for identifying vulnerabilities in applications by intercepting function calls.

In step 210 the modification module 110 may identify at least one function according to at least one rule for modification of functions in the code of the application being analyzed 180. In some aspects, the rule contains at least the prototype of the function and the calling convention for that function. In some aspects, the function is a function of standard libraries of programming languages. In one exemplary aspect, the rules for modification are stored in the database 190. In yet another possible exemplary aspect, the rule for modification additionally contains a set of actions which are to be performed as a result of the adding interception code.

In step 220 the modification module 110 may, in one aspect, add, upon launching the application being analyzed 180, an interception code into the executable code of the application being analyzed 180. More specifically, according to one aspect the interception code is added into a portion of the memory space allocated for execution of the executable code of the application being analyzed 180—see paragraphs 34-37 above for further details. The added interception code, when executed, intercepts the function call and takes over control of the process. Upon completion of the execution of the executable code, execution control is returned to the function.

In step 230 the execution module 120 may execute the application being analyzed 180 after adding the interception code. In one exemplary aspect, the execution of the application being analyzed 180 is performed with the use of automatic tests. In one aspect, automatic tests are generally tests performed without human intervention. In this exemplary aspect, the vulnerability is exploited only after the user triggers an event (e.g., entering data into a field). This process however may be automated without user involvement.

In step 240 the execution module 120 may collect (e.g., gather) data obtained by the added interception code. In one exemplary aspect, the above-described actions are performed by the code modification executed by the modification module 110.

In step 250 the analysis means 130 may analyze the mentioned data with the aid of at least one criterion for safe execution, the criterion containing at least the range of permissible values of the arguments for functions for which the interception code was added to intercept their call. In one exemplary aspect, the criteria for safe execution are stored in the database 190.

In step 260 the analysis means 130 may identify at least one vulnerability in the application being analyzed 180 in the event of inconsistency between the mentioned data and the range of permissible values for at least one of the criteria.

Figure 3:
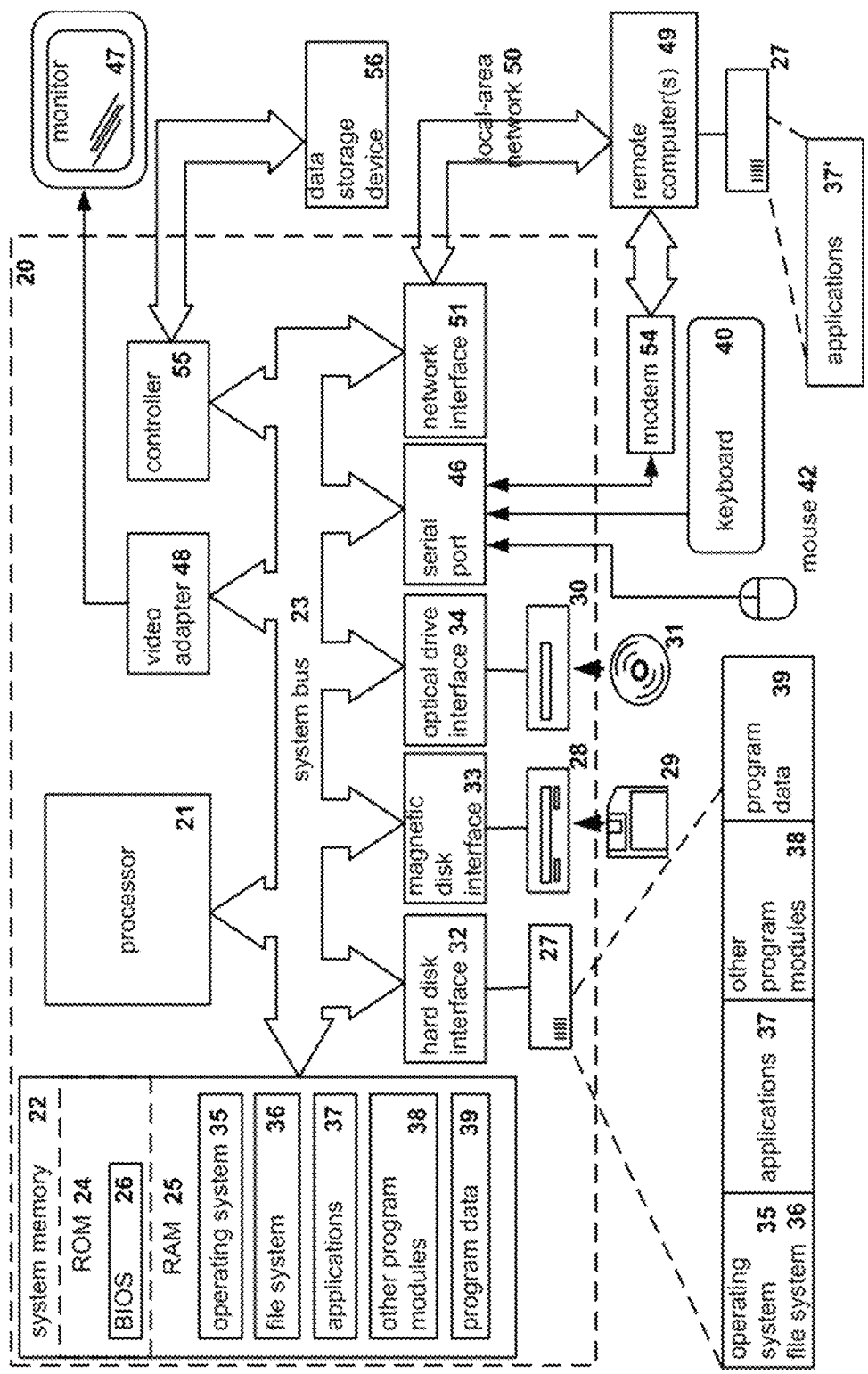
FIG. 3 represents an example of a general-purpose computer system on which aspects of the present disclosure may be realized.

FIG. 3 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of identifying vulnerabilities of an application, the method comprising:
   identifying, by a hardware processor, at least one function in executable code of the application according to at least one rule for modification of functions, the at least one rule containing at least a prototype of the function and a calling convention for the function;
   adding an interception code to the executable code of the application upon launching of the application, wherein the interception code is configured to intercept calls to functions made by the application and to establish control over a process associated with the application, and wherein the interception code modifies functionality of the application by calling a function in the interception code with an Application Binary Interface (ABI) that matches an intercepted function;
   executing, by the hardware processor, the application with the added interception code;
   collecting, by the interception code, data relating to function calls performed by the application during execution;
   analyzing the collected data based on criteria for safe execution of applications, wherein the criteria comprises a range of permissible values of arguments of intercepted function calls; and
   identifying inconsistencies between the analyzed data and the criteria for safe execution of applications, wherein the inconsistencies indicate vulnerabilities in the application.

2. The method of claim 1, wherein the intercepted functions comprise at least one of a function of the operating system or a function of standard libraries of programming languages.

3. The method of claim 1, wherein the rules of modification specify a set of actions that the interception code performs during execution.

4. The method of claim 3, wherein the actions comprise one or more of saving arguments of the function in a log file, generating a system event, not executing an intercepted function, and changing a value of an argument.

5. The method of claim 4, wherein the rules of modification further specify conditions for validity of changing a value of an argument of an intercepted function.

6. The method of claim 1, further comprising:
   executing the application using automatic tests.

7. The method of claim 1, wherein the data comprises values of arguments of the intercepted functions.

8. The method of claim 1, further comprising:
   identifying a degree of criticality contained in the criterion; and
   interrupting execution of the application when the degree of criticality exceeds a predetermined threshold value.

9. The method of claim 1, further comprising:
   identifying a degree of criticality contained in the criterion; and
   creating a log entry regarding the at least one vulnerability when the degree of criticality exceeds a predetermined threshold value.

10. A system of identifying vulnerabilities of an application, the system comprising:
    a hardware processor configured to:
       identify at least one function in executable code of the application according to at least one rule for modification of functions, the at least one rule containing at least a prototype of the function and a calling convention for the function;
       add an interception code to the executable code of the application upon launching of the application, wherein the interception code is configured to intercept calls to functions made by the application and to establish control over a process associated with the application, and wherein the interception code modifies functionality of the application by calling a function in the interception code with an Application Binary Interface (ABI) that matches an intercepted function;
       execute the application with the added interception code;
       collecting, by the interception code, data relating to function calls performed by the application during execution;
       analyze the collected data based on criteria for safe execution of applications, wherein the criteria comprises a range of permissible values of arguments of intercepted function calls, and
       identify inconsistencies between the analyzed data and the criteria for safe execution of applications, wherein the inconsistencies indicate vulnerabilities in the application.

11. The system of claim 10, wherein the intercepted functions comprise at least one of a function of the operating system or a function of standard libraries of programming languages.

12. The system of claim 10, wherein the rules of modification specify a set of actions that the interception code performs during execution.

13. The system of claim 12, wherein the actions comprise one or more of saving arguments of the function in a log file, generating a system event, not executing an intercepted function, and changing a value of an argument.

14. The system of claim 13, wherein the rules of modification further specify conditions for validity of changing a value of an argument of an intercepted function.

15. The system of claim 10, wherein the hardware processor is further configured to:
    execute the application using automatic tests.

16. The system of claim 10, wherein the data comprises values of arguments of the intercepted functions.

17. The system of claim 10, wherein the hardware processor is further configured to:
    identify a degree of criticality contained in the criterion; and
    interrupt execution of the application when the degree of criticality exceeds a predetermined threshold value.

18. The system of claim 10, wherein the hardware processor is further configured to:
    identify a degree of criticality contained in the criterion; and
    create a log entry regarding the at least one vulnerability when the degree of criticality exceeds a predetermined threshold value.

19. A non-transitory computer-readable medium storing instructions thereon for identifying vulnerabilities of an application, the instructions comprising:

identifying at least one function in executable code of the application according to at least one rule for modification of functions, the at least one rule containing at least a prototype of the function and a calling convention for the function;

adding an interception code to the executable code of the application upon launching of the application, wherein the interception code is configured to intercept calls to functions made by the application and to establish control over a process associated with the application, and wherein the interception code modifies functionality of the application by calling a function in the interception code with an Application Binary Interface (ABI) that matches an intercepted function;

executing, by the hardware processor, the application with the added interception code;

collecting, by the interception code, data relating to function calls performed by the application during execution;

analyzing the collected data based on criteria for safe execution of applications, wherein the criteria comprises a range of permissible values of arguments of intercepted function calls; and identifying inconsistencies between the analyzed data and the criteria for safe execution of applications, wherein the inconsistencies indicate vulnerabilities in the application.

20. The medium of claim 19, wherein the intercepted functions comprise at least one of a function of the operating system or a function of standard libraries of programming languages.

\* \* \* \* \*